US010972427B1

(12) United States Patent
Hu

(10) Patent No.: US 10,972,427 B1
(45) Date of Patent: Apr. 6, 2021

(54) METHODS, SYSTEMS, AND DEVICES FOR IDENTIFYING AN IP ADDRESS FROM A MIXED DATA POOL USING ARTIFICIAL INTELLIGENCE

(71) Applicant: AT&T Intellectual Property I, L.P., Atlanta, GA (US)

(72) Inventor: Yuan-Chi Hu, Dunwoody, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/710,407

(22) Filed: Dec. 11, 2019

(51) Int. Cl.
*H04L 29/12* (2006.01)
*H04L 12/749* (2013.01)
*H04L 12/24* (2006.01)

(52) U.S. Cl.
CPC .......... *H04L 61/2046* (2013.01); *H04L 41/16* (2013.01); *H04L 45/741* (2013.01); *H04L 61/2007* (2013.01); *H04L 61/2061* (2013.01); *H04L 61/6086* (2013.01)

(58) Field of Classification Search
None
See application file for complete search history.

(56) References Cited

U.S. PATENT DOCUMENTS

| | | | | |
|---|---|---|---|---|
| 6,862,286 B1 * | 3/2005 | Tams | ................ | H04L 29/12018 370/395.32 |
| 7,020,720 B1 * | 3/2006 | Donahue | ........... | H04L 29/12009 709/245 |
| 7,165,122 B1 * | 1/2007 | Sitaraman | ........... | H04L 61/2061 709/213 |
| 7,197,549 B1 * | 3/2007 | Salama | ............. | H04L 29/12283 709/223 |

* cited by examiner

*Primary Examiner* — Jeffrey R Swearingen
(74) *Attorney, Agent, or Firm* — Guntin & Gust, PLC; Atanu Das

(57) ABSTRACT

Aspects of the subject disclosure may include, for example, embodiments that include obtaining a first data pool of different types of data. The different types of data include a first group of IPv4 addresses. Further embodiments include selecting a first portion of the first group of IPv4 addresses using artificial intelligence techniques and storing the first portion of the first group of IPv4 addresses in a first table of IPv4 addresses. Additional embodiments can include assigning a first IPv4 address in the first table to a first computing device in response to determining the first IPv4 address in the first table is not currently being used. Other embodiments are disclosed.

20 Claims, 13 Drawing Sheets

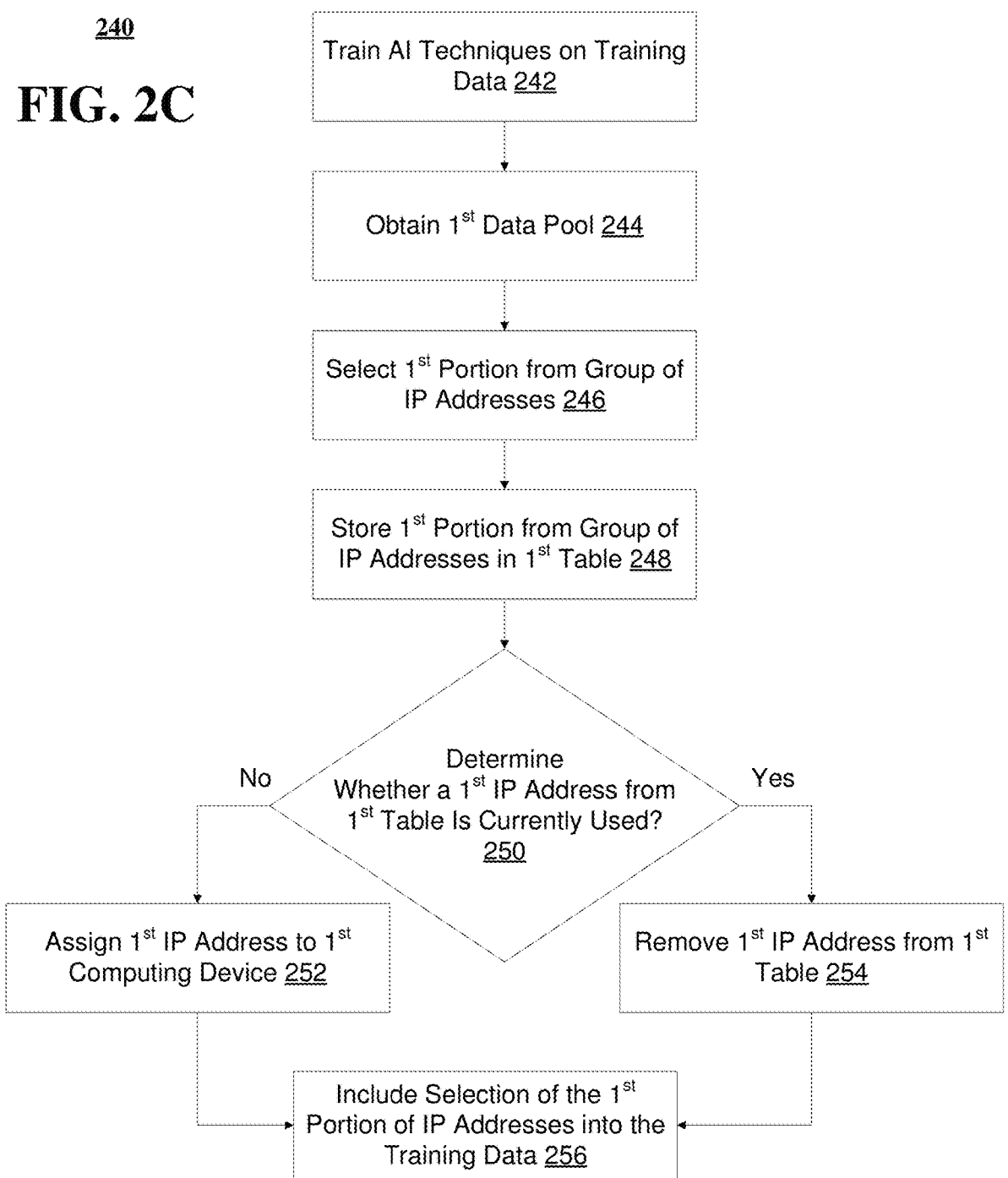

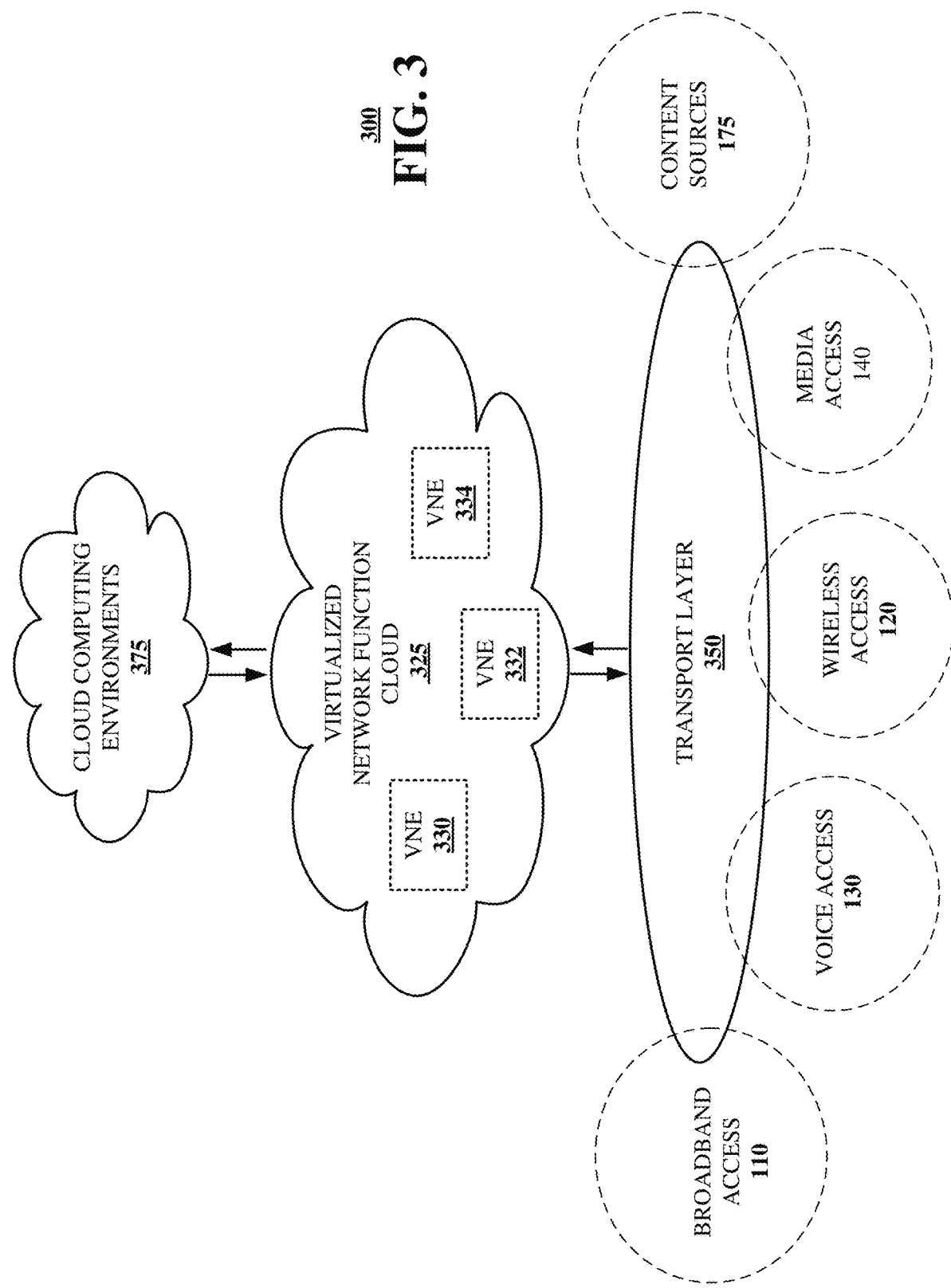

US 10,972,427 B1

METHODS, SYSTEMS, AND DEVICES FOR IDENTIFYING AN IP ADDRESS FROM A MIXED DATA POOL USING ARTIFICIAL INTELLIGENCE

FIELD OF THE DISCLOSURE

The subject disclosure relates to methods, systems, and devices for identifying an IP address from a mixed data pool using artificial intelligence.

BACKGROUND

Automated systems for provisioning an IP address to a computing device can result in provisioning an IP address to two different computing devices (e.g., duplicate IP address assigned to two different computing devices). Consequently, a computing device with a duplicate IP address can lose service for a period of time, while a patch can be developed and delivered to at least one of the computing devices to provision it with a different IP address, thereby re-instating service to the computing device.

BRIEF DESCRIPTION OF THE DRAWINGS

Reference will now be made to the accompanying drawings, which are not necessarily drawn to scale, and wherein:

FIGS. 2C-D depicts illustrative embodiments of methods in accordance with various aspects described herein.

FIG. 3 is a block diagram illustrating an example, non-limiting embodiment of a virtualized communication network in accordance with various aspects described herein.

DETAILED DESCRIPTION

Figure 1:
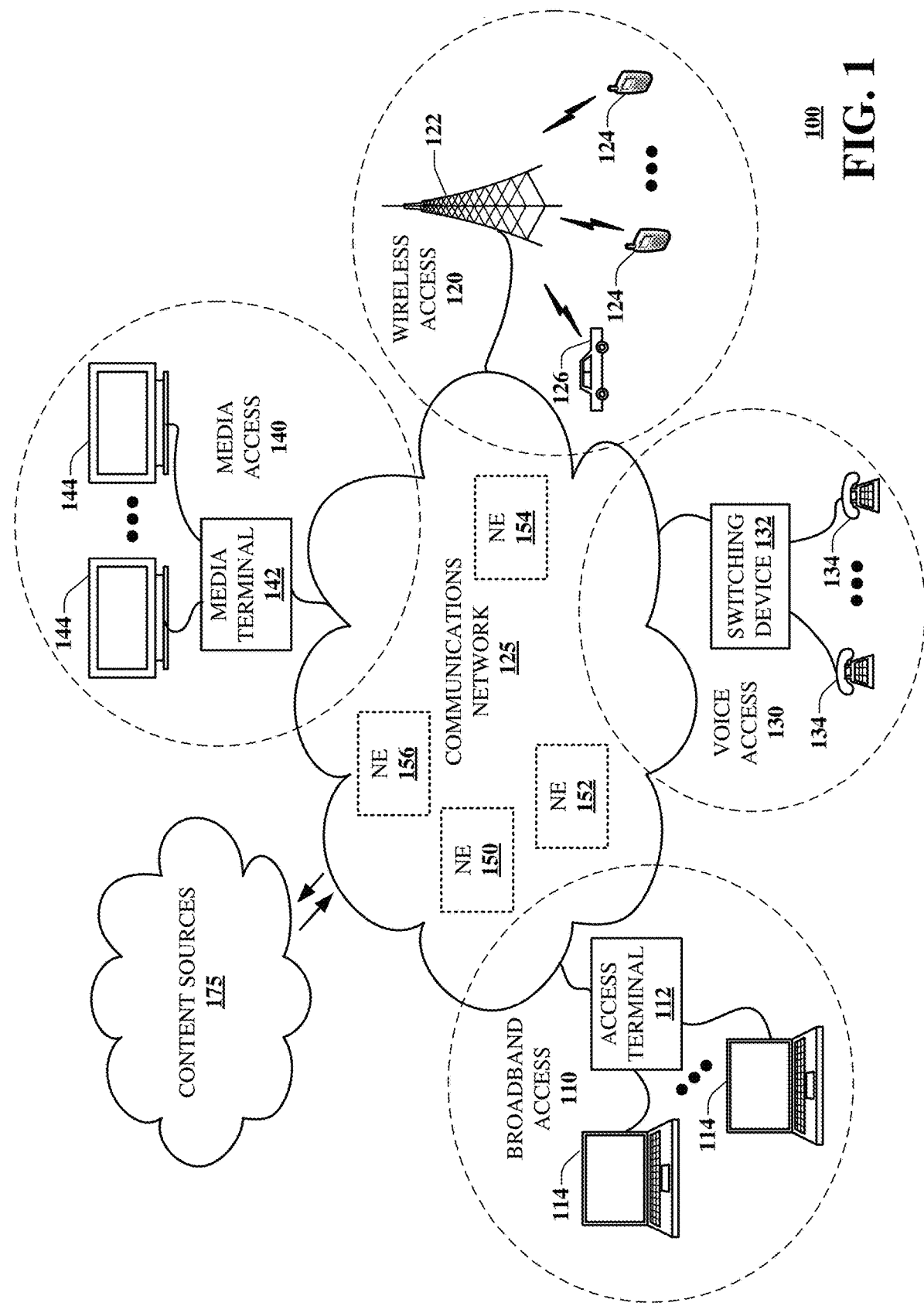
FIG. 1 is a block diagram illustrating an exemplary, non-limiting embodiment of a communications network in accordance with various aspects described herein.

The subject disclosure describes, among other things, illustrative embodiments for obtaining a first data pool of different types of data. The different types of data include a first group of IPv4 addresses. Further embodiments can include selecting a first portion of the first group of IPv4 addresses using artificial intelligence techniques, and storing the first portion of the first group of IPv4 addresses in a first table of IPv4 addresses. Additional embodiments can include assigning a first IPv4 address in the first table to a first computing device in response to determining the first IPv4 address in the first table is not currently being used. Other embodiments are described in the subject disclosure.

One or more aspects of the subject disclosure include a device, comprising a processing system including a processor, and a memory that stores executable instructions that, when executed by the processing system, facilitate performance of operations. The operations can include obtaining a first data pool of different types of data. The different types of data include a first group of IPv4 addresses. Further operations can include selecting a first portion of the first group of IPv4 addresses using artificial intelligence techniques, and storing the first portion of the first group of IPv4 addresses in a first table of IPv4 addresses. Additional operations can include assigning a first IPv4 address in the first table to a first computing device in response to determining the first IPv4 address in the first table is not currently being used.

One or more aspects of the subject disclosure include a machine-readable medium, comprising executable instructions that, when executed by a processing system including a processor, facilitate performance of operations. The operations can include obtaining a first data pool of different types of data. The different types of data include a first group of IPv4 addresses. Further operations can include selecting a first portion of the first group of IPv4 addresses using artificial intelligence techniques, and storing the first portion of the first group of IPv4 addresses in a first table of IPv4 addresses. Additional operations can include assigning a first IPv4 address in the first table to a first computing device in response to determining the first IPv4 address in the first table is not currently being used. Also, operations can include removing a second IPv4 address from the first table in response to determining the second IPv4 address in the first table is currently being used by a second computing device.

One or more aspects of the subject disclosure include a method. The method can include training, by a processing system including a processor, artificial intelligence techniques on training data to recognize IPv4 addresses from a first data pool that includes different types of data. Further, the method can include obtaining, by the processing system, a second data pool of the different types of data. The different types of data include a first group of IPv4 addresses. In addition, the method can include selecting, by the processing system, a first portion of the first group of IPv4 addresses using artificial intelligence techniques, and storing, by the processing system, the first portion of the first group of IPv4 addresses in a first table of IPv4 addresses. Also, the method can include assigning, by the processing system, a first IPv4 address in the first table to a first computing device in response to determining the first IPv4 address in the first table is not currently being used.

Referring now to FIG. 1, a block diagram is shown illustrating an example, non-limiting embodiment of a communications network 100 in accordance with various aspects described herein. For example, communications network 100 can facilitate in whole or in part identifying an IP address from a pool of different types of data that include a group of IP addresses and determining whether the IP address is currently being used by a computing device. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
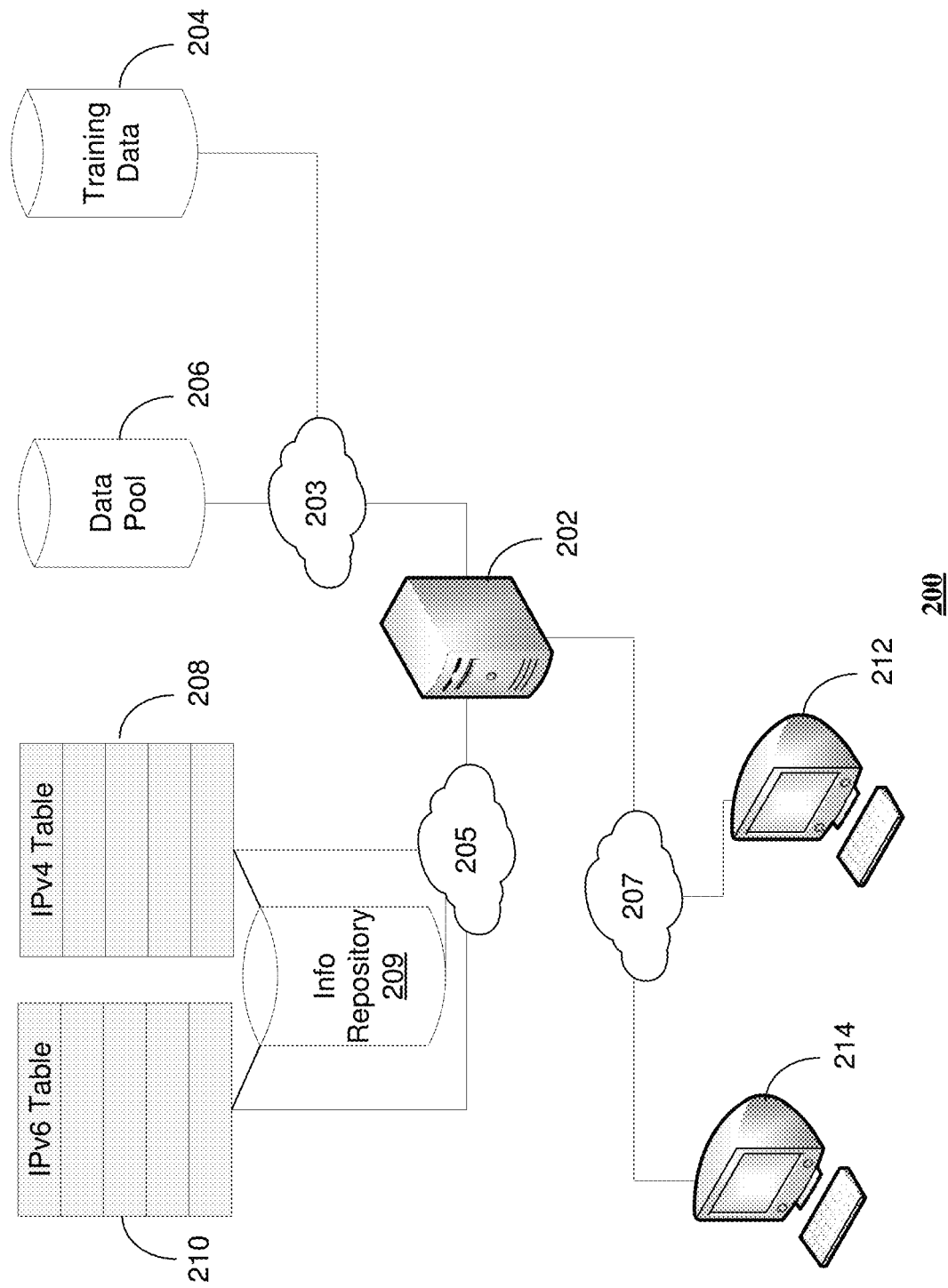
FIGS. 2A-B are block diagrams illustrating example, non-limiting embodiments of systems functioning within the communication network of FIG. 1 in accordance with various aspects described herein.
Figure 2B:
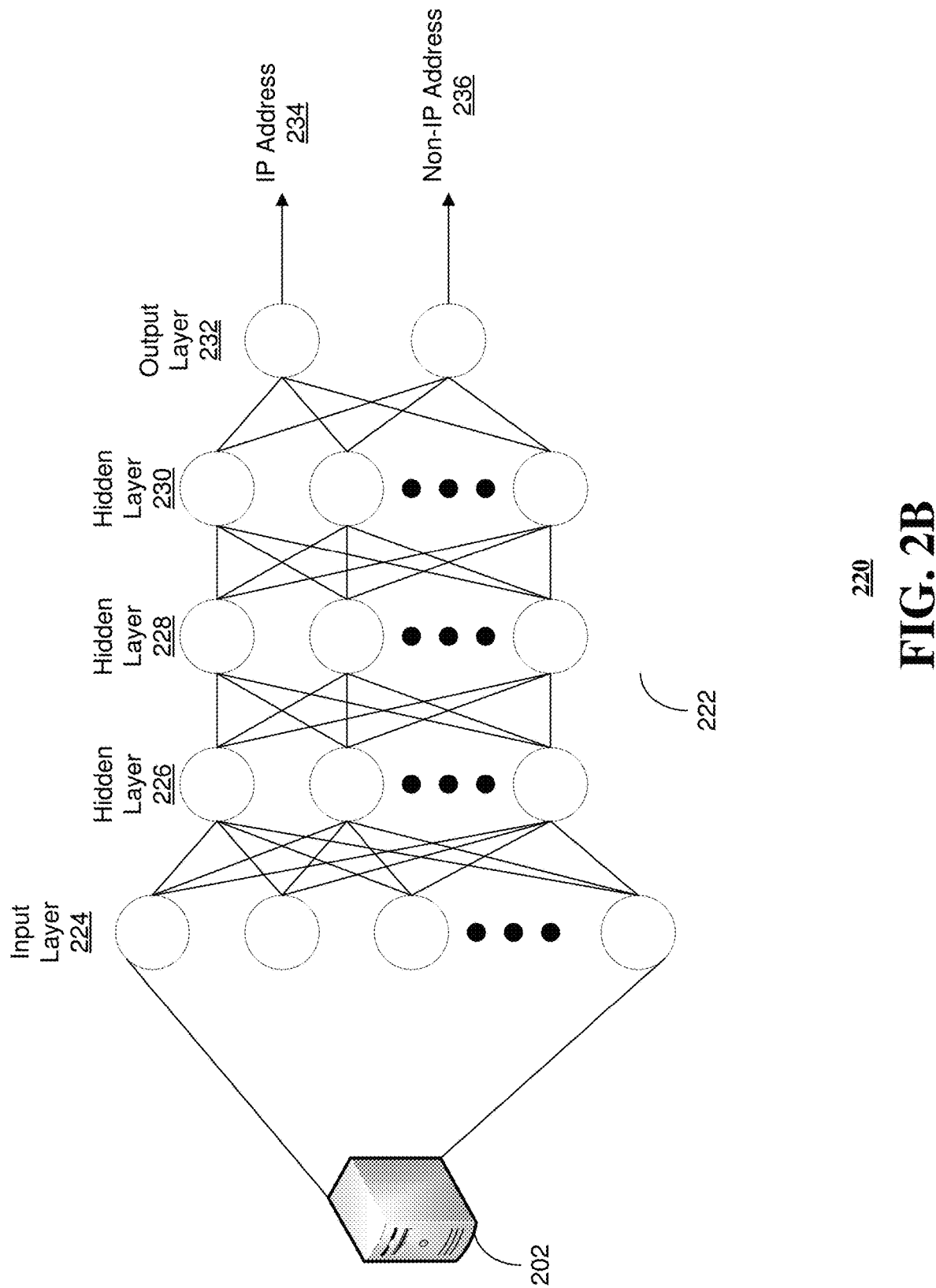
Figure 2D:
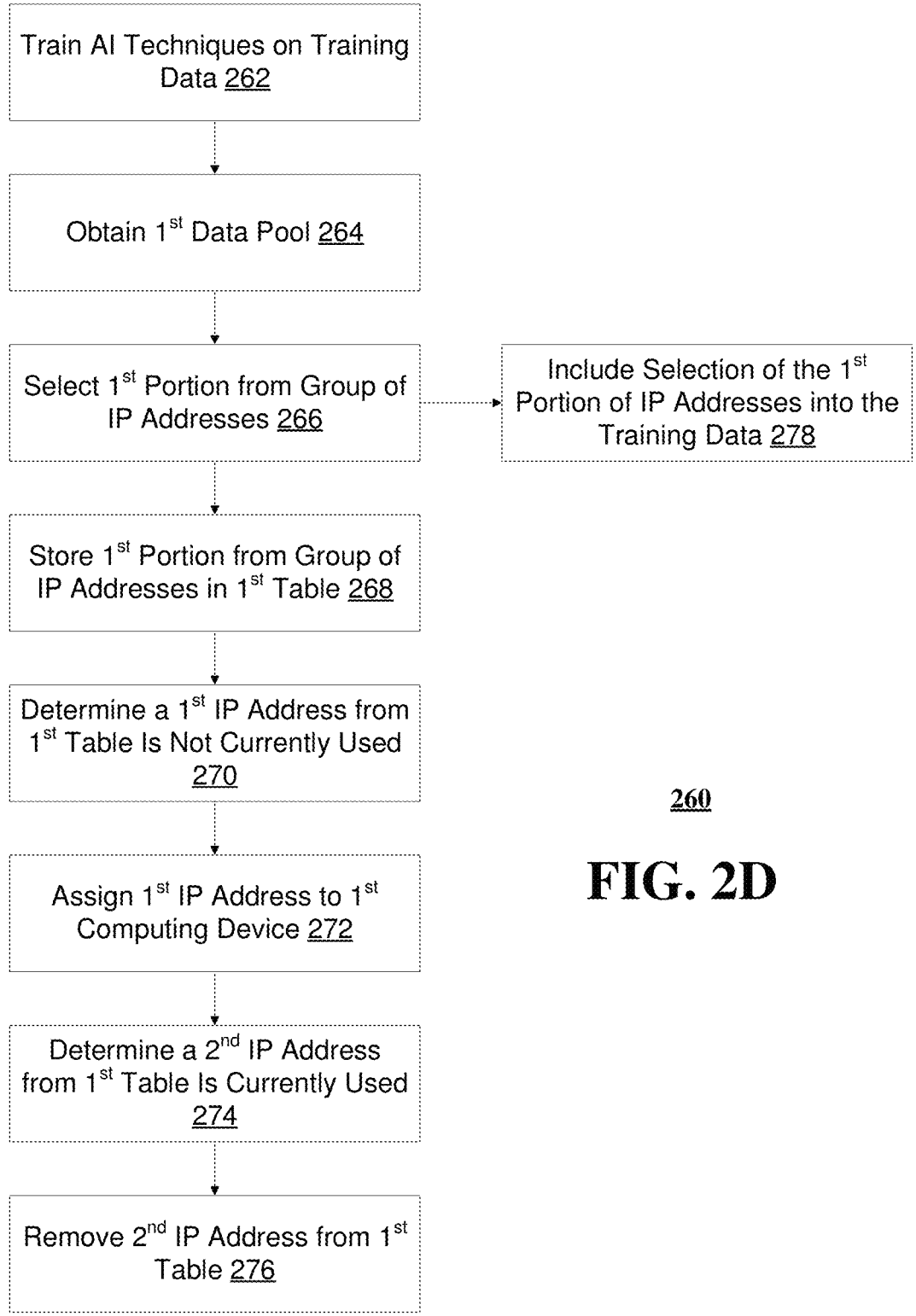
Figure 2E:
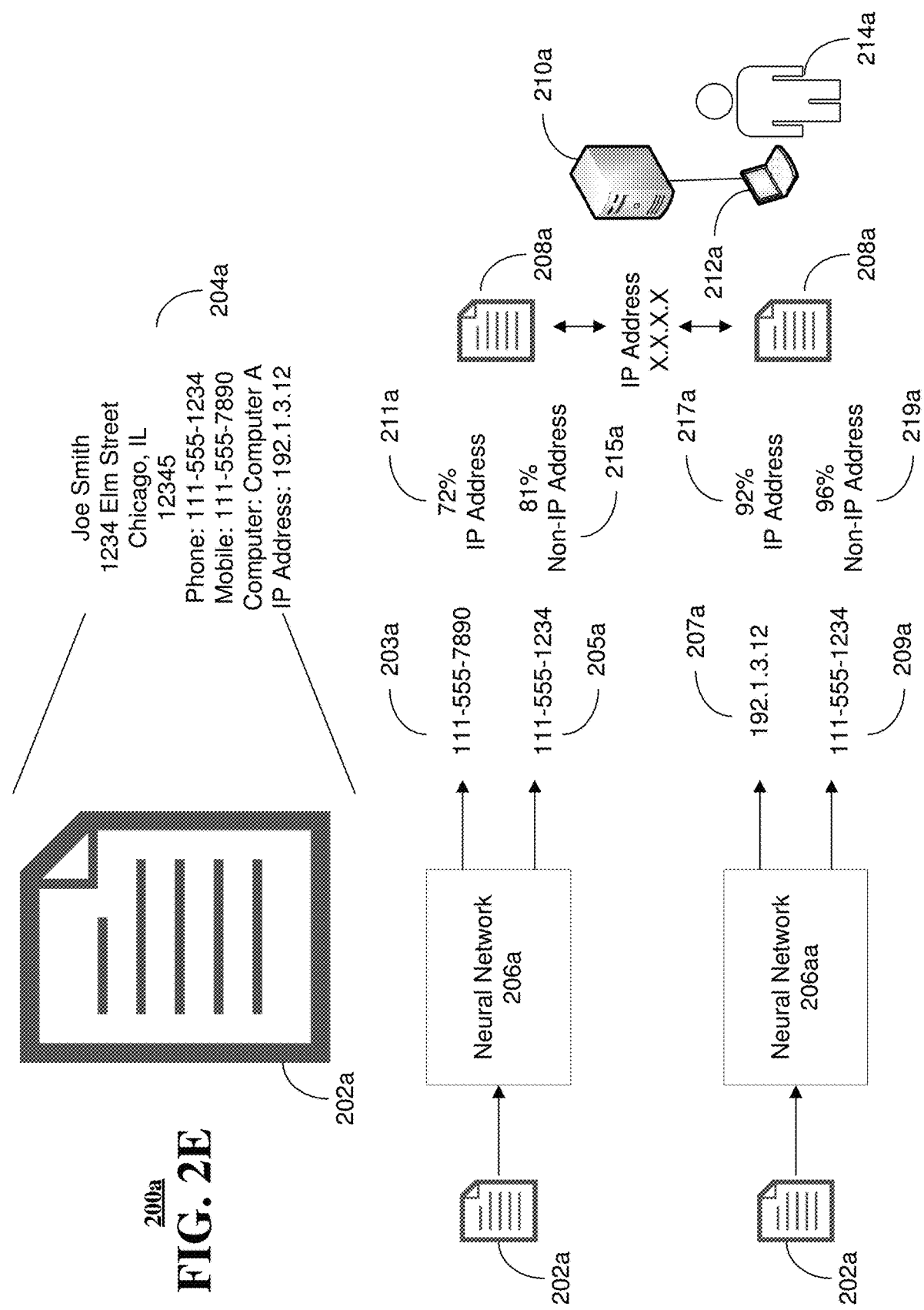
FIG. 2E is a block diagram illustrating an example, non-limiting embodiment of systems functioning within the communication network of FIG. 1 in accordance with various aspects described herein.
Figure 2F:
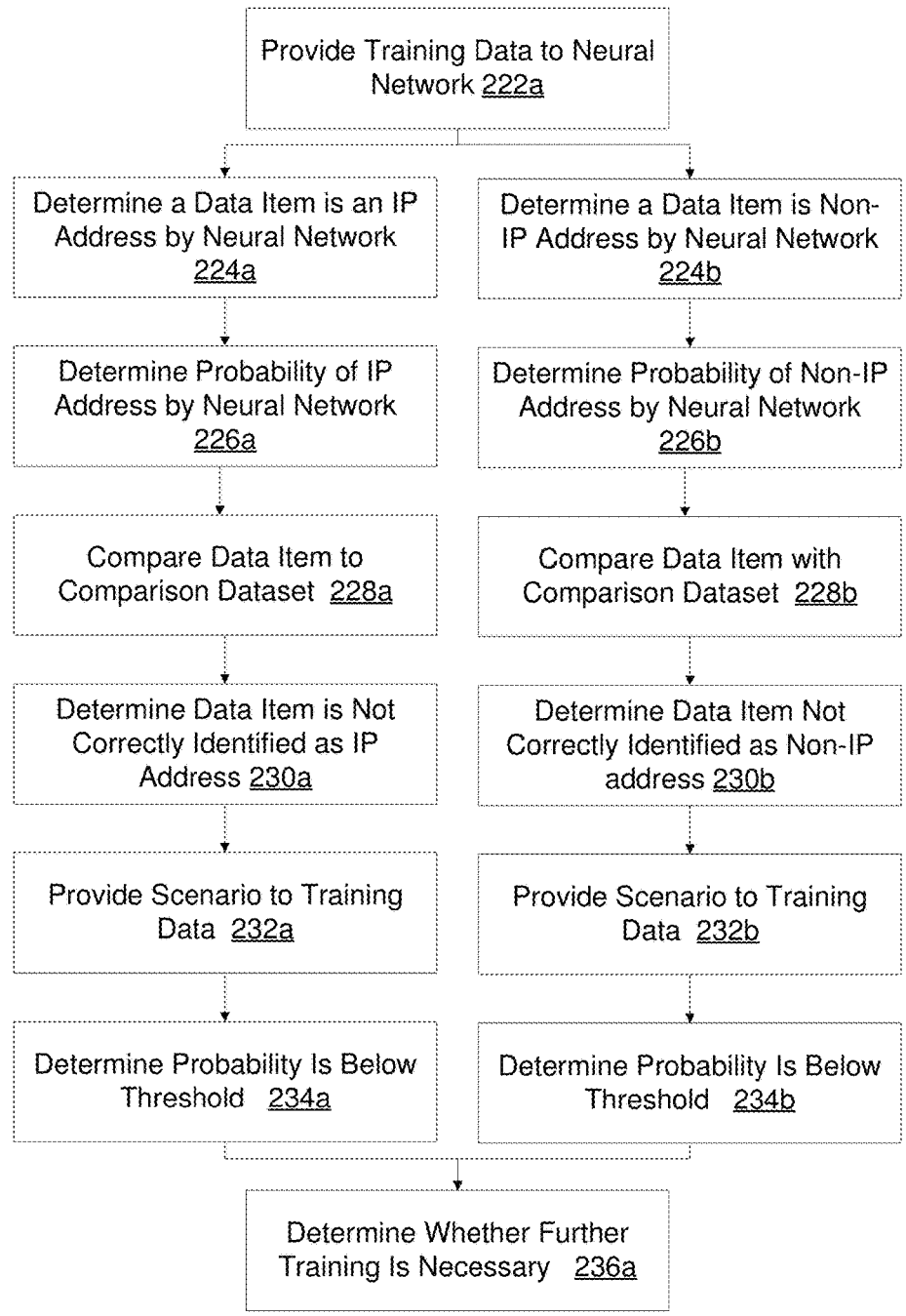
FIGS. 2F-G depicts illustrative embodiments of methods in accordance with various aspects described herein.
Figure 2G:
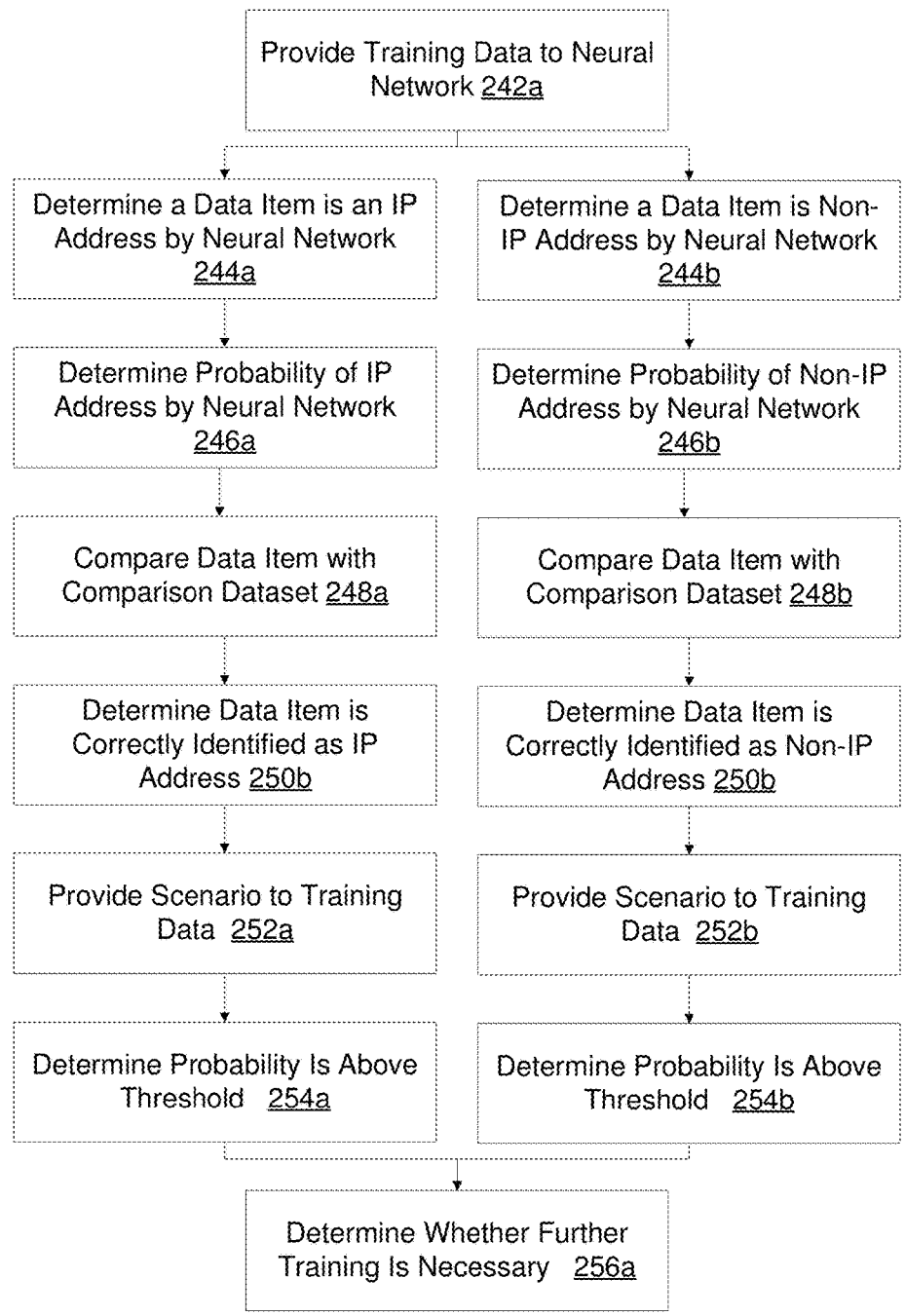
Figure 2H:
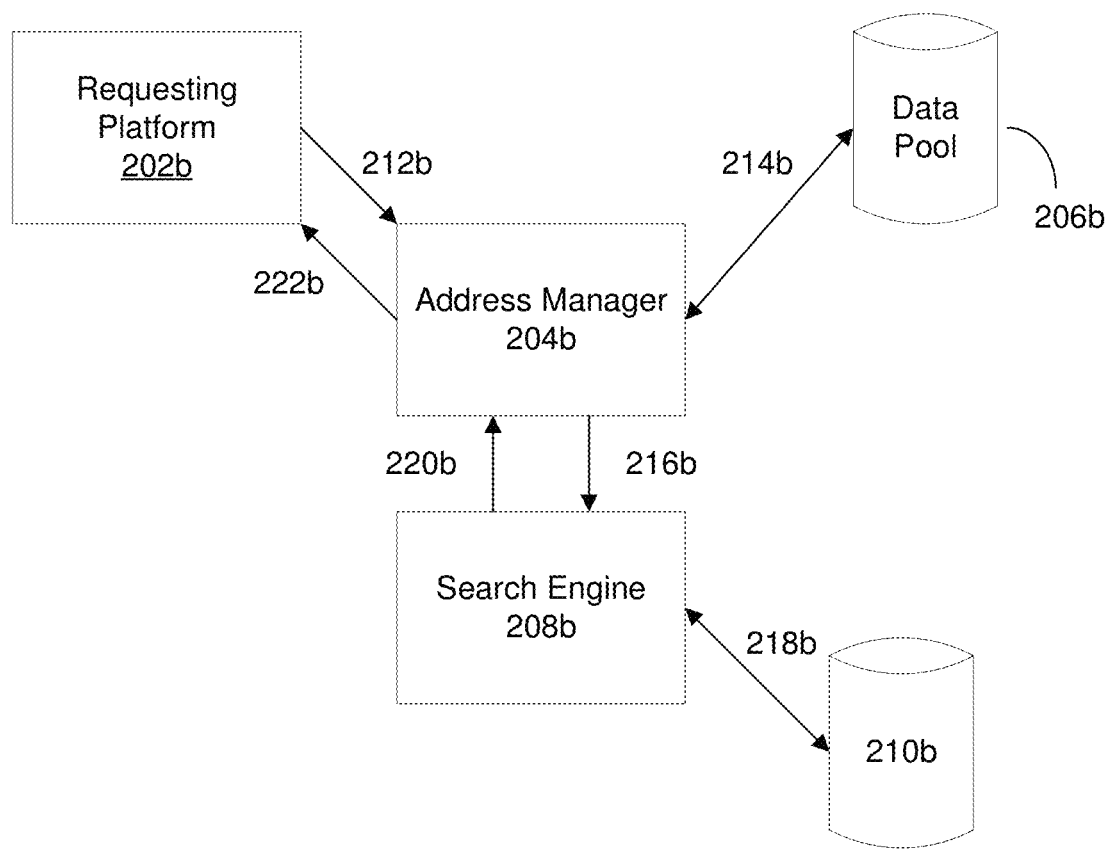
FIG. 2H is a block diagram illustrating an example, non-limiting embodiment of systems functioning within the communication network of FIG. 1 in accordance with various aspects described herein.

FIGS. 2A-B and 2H are block diagrams illustrating example, non-limiting embodiments of systems functioning within the communication network of FIG. 1 in accordance with various aspects described herein. Referring to FIG. 2A, in one or more embodiments, a system 200 can be used to automatically and dynamically provision an IP address to one or more computing devices 212, 214. Further, system 200 can include a server 202 communicatively coupled to a group of computing devices 212, 214 over a communication network 207. In addition, the system 200 can include the server 202 communicatively coupled to one or more databases 204, 206 over a communication network 203. In some embodiments, one database 204 can include training data and another database 206 can include a data pool of different types of data that can include IP addresses The IP addresses can include IPv4 addresses or IPv6 addresses as well as other address mechanisms that can be used to identify computing devices. In other embodiments, the training data and data pool can be stored in one database. Also, the server 202 can be communicatively coupled to an information repository 209 (e.g. database, server, etc.) over a communication network 205. The information repository 209 can include a table 208 of IPv4 addresses and a table 210 IPv6 addresses. The communication networks 203, 205, 207 can include a wired communication network, wireless communication network, or a combination thereof. The computing devices 212 can include, but not limited to, a desktop computer, laptop computer, tablet computer, mobile device, mobile phone, wearable device, smartwatch, or any other computing device.

In one or more embodiments, the server 202, operated by an entity, can store and execute artificial intelligence techniques that can be a software application to recognize an IP address from a data pool stored on a database 206, and determine whether the IP address is currently being used by a computing device within the entity, and if not, provision the IP address to a computing device operated by the entity. The entity can be a company, non-profit, or any organization that operates computing devices that use one or more IP addresses. The IP address can be an IPv4 address, an IPv6 address, or any other type of IP address or addressing mechanism for computing devices. In further embodiments, prior to attempting to recognize an IP address from the data pool, the artificial intelligence techniques can be trained to identify an IP address from training data stored in a database 204. In additional embodiments, the artificial intelligence techniques can be implemented by a neural network. Embodiments that are directed to training the artificial intelligence techniques implemented by the neural network word are discussed when describing FIGS. 2E-2G. In some embodiments, the database 204 and database 206 can be the same database. In other embodiments, the database 204 and database 206 can be separate databases. In further embodiments, the database 204, database 206, and server 202 can be one computing device.

In one or more embodiments, the server 202 trains the artificial intelligence techniques on training data to recognize an IP address (or other addressing mechanism). In some embodiments, the server 202 obtains, over communication network 203, the training data from database 204. Further, the training data can include a data pool that includes the different types of data or a mix of data. The different types of data can include IPv4 addresses, IPv6 addresses as well as other data (e.g., such as personal identifiable information that can include a person's name, physical address, telephone number, email address, location coordinates, location data, or any other data, etc.).

In one or more embodiments, the server 202 can obtain, over the communication network 203, a data pool of different types of data from database 206 that may be similar to the different types of data in the training data. The different types of data can include IPv4 addresses, IPv6 addresses as well as other data (e.g., such as personal identifiable information that can include a person's name, physical address, telephone number, email address, location coordinates, location data, or any other data, etc.).

The different types of data can include a group of IP addresses. Further, the server can select, recognize, or identify, a portion of the group of IP addresses from the data pool using the artificial intelligence techniques. In addition, the server 202 can store the portion of the group of IP addresses in a table 208, 210 of IP addresses. The table 208, 210 of IP addresses can be in an information repository 209 that can be a database, web server, or any other type of information repository. Further, the server 202 can send the portion of the group of IP addresses to the information repository 209 over a communication network 205. Further, the server 202 can select, recognize, or identify IPv4 addresses or IPv6 addresses from the portion of the group of IP addresses. In some embodiments, the server can store IPv4 for addresses in one table 208 and IPv6 addresses in another table 210. In other embodiments, the information repository 209 can be part of server 202.

In one or more embodiments, the server 202 can recognize IP address from the data pool 206 in advance. Further, the identified IP address can be stored in tables 208, 210. Further, the server 202 can have two functions. Prior to run time, server 202 has artificial intelligence to recognize an IP address. During run time, when a service request is received, the server 202 can utilize a search engine to quickly search tables 208, 210 determine whether an identified IP address matches an IP address in tables 208, 210. (See FIG. 2H and its description herein).

In one or more embodiments, the server 202 can access an IP address from a table 208, 210 (over a communication network 205) and determine the IP address is not currently being used by a computing device operated by the entity. For example, the server 202 can compare the IP address accessed form the table 208, 210 with a list of IP addresses currently being used by computing devices within the entity to determine whether the IP address accessed from the table 210, 212 is currently in use (such a list of currently used IP addresses can be maintained by periodically querying/obtaining IP addresses of the entity's computing devices and storing them in the list). If not, the server 202 can assign the IP address to a computing device 212, over a communication network 207.

In one or more embodiments, the server 202 can access an IP address from a table 208, 210 (over a communication network 205) and determine the IP address is currently used by a computing device 214 operated by the entity, as described herein. Thus, the server 202 can remove the IP address from the table so that it will not mistakenly be assigned to a computing device in the future, thereby creating IP address conflict by having two computing devices assigned the same IP address.

In one or more embodiments, the server 202 can include the selection, recognition, or identification of the portion of IP addresses from the group of IP addresses from the data pool to the training data. That is, the server 202 can send the selection, recognition, or identification of the IP addresses to the database 204, over the communication network 203, to be stored in database 204 and included in the training data to be used in the future.

In one or more embodiments, the server 202 can recognize several IPv4 addresses and several IPv6 addresses from the data pool stored in database 206 and determine whether they are currently being used by computing devices operated by the entity. The server 202 can obtain the training data from the database 204, over communication network 203, and train the artificial intelligence techniques on training data to recognize IPv4 addresses from training data stored in database 204. The training data can be a data pool that includes the different types of data. Further, the server 202 can obtain a data pool of different types of data from database 206 over communication network 203. The different types of data include a group of IPv4 addresses. In addition, the server 202 can select a portion of the group of IPv4 addresses using artificial intelligence techniques. In addition, the server 202 can store the portion of the group of IPv4 addresses in a table 208 of IPv4 addresses in information repository 209, in which the portion of the IPv4 addresses are sent to the information repository 209 over communication network 205 to be stored in table 208. Also, the server 202 can access an IPv4 address from the table 208 in information repository 209 over communication network 205 and assign the first IPv4 address to a computing device 212 over communication network 207 in response to the server 202 determining the IPv4 address is not currently being used (as described herein).

In one or more embodiments, the server 202 can access an IPv4 address from the table 208 in information repository 209 over communication network 205 and provide instructions to the information repository 209 to remove the IPv4 address from the table 208 in response to the server 202 determining the IPv4 address is currently being used by a computing device 214 (as described herein).

In one or more embodiments, the server 202 can include the selecting of the portion of the group of IPv4 address for training by sending the selection of the portion of the IPv4 addresses to the database 204 to be included into the training data to be used in the future.

In one or more embodiments, the server 202 can obtain the training data from the database 204, over communication network 203, and train the artificial intelligence techniques on training data to recognize IPv6 addresses from training data stored in database 204. The training data can be a data pool that includes the different types of data. Further, the server 202 can obtain a data pool of different types of data from database 206 over communication network 203. The different types of data include a group of IPv6 addresses. In addition, the server 202 can select a portion of the group of IPv6 addresses using artificial intelligence techniques. In addition, the server 202 can store the portion of the group of IPv6 addresses in a table 210 of IPv6 addresses in information repository 209, in which the portion of the IPv6 addresses are sent to the information repository 209 over communication network 205 to be stored in table 210. Also, the server 202 can access an IPv6 address from the table 210 in information repository 209 over communication network 205 and assign the first IPv6 address to a computing device 212 over communication network 207 in response to the server 202 determining the IPv6 address is not currently being used (as described herein).

In one or more embodiments, the server 202 can access an IPv6 address from the table 210 in information repository 209 over communication network 205 and provide instructions to the information repository 209 to remove the IPv6 address from the table 210 in response to the server 202 determining the IPv6 address is currently being used by a computing device 214 (as described herein).

In one or more embodiments, the server 202 can include the selecting of the portion of the group of IPv6 address for training by sending the selection of the portion of the IPv6 addresses to the database 204 to be included into the training data to be used in the future.

Referring to FIG. 2B, in one or more embodiments, a system 220 can comprise the server 202 that includes artificial intelligence techniques implemented by a neural network 222. Further, the neural network 222 can include an input layer 224, several hidden layers 226, 228, 230, and an output layer 232. Although neural network 222 is shown with three hidden layers 226, 228, 230, the neural network 222 can include any number of hidden layers.

In one or more embodiments, the neural network 222 can be trained using training data to recognize IP address from a mixed data pool (e.g., different types of data) (details of the training of the artificial intelligence techniques are discussed when describing FIGS. 2E-2G). In further embodiments, a data pool can be provided to the input layer 224 and the data pool can be processed by the neural network 222. The data pool can include different types of data such as IP addresses and Non-IP addresses, as described herein. The neural network 222 can select, recognize, or identify an IP address 234 from the data pool and data that is a Non-IP address 236. The IP address 234 and/or the Non-IP address 236 can provided by the output layer 232 of the neural network 222.

Referring to FIG. 2H, in one or more embodiments, system 200b can include a requesting platform 202b, address manager 204b, a data pool 206b, a search engine 208b, and a database 210b. A requesting platform 202b can be a server or client computing device (or a group of such servers or computing devices or an entity representing a group of servers/computing devices) that is requesting a provisioning of an IP address for one of its computing devices. The address manager 204b accesses data from a data pool 206b. The data pool 206b can be stored in a database that can be similar to the data pool 206 described in FIG. 2A. The address manager 204b can identify an IP address from the data from data pool 206b using a neural network as described herein. Database 210b can include information repository 209 that comprises tables 208, 210 in FIG. 2A. A search engine 208b can search database 210b for the IP address identified by the address manager 204b to determine whether it is already in use, and if not, notify the address manager 204b that it can provision the IP address.

In one or more embodiments, the system 200b can implements a series of steps to provide an IP address to the requesting platform 202b. At step 212b, the requesting platform 202b can request an IP address from the address manager 204b. At step 214b, the address manager 204b can identify an IP address from the data pool 206b and remove it from the data pool 206b. At step 216b, the address manager 204b provides the identified IP address to the search engine 208b. At step 218b, the search engine 208b searches the tables 208, 210 stored in database 210b to determine whether the identified IP address is already stored in the tables 208, 210 (indicating that it may already be in use). At step, 220b, if no match is found, the system continues to step 222b, in which the search engine 208b notifies the address manager 204b that not match has been found. If a match is found, then a request is sent to the address manager 204b to identify another IP address. At step 222b, the IP address is provided to the requesting platform 202b to provision a computing device by the address manager 204b. The functions of the address manager and search engine can be implemented by a server 202 in FIG. 2A or across multiple servers. In some embodiments, the functions of the address manager can be in one server and the functions of the search engine can be in another server. Such servers can be managed by one entity or managed by several entities.

FIGS. 2C-D depicts illustrative embodiments of methods in accordance with various aspects described herein. The methods in FIGS. 2C-D can be implemented by a server, servers, or other computing device(s). Referring to FIG. 2C, in one or more embodiments, the method 240 can include the server, at 242, training artificial intelligence techniques on training data to (automatically, with no or little human intervention as discussed in describing FIGS. 2E-G) recognize IP addresses from a data pool that includes different types of data. Further, the method 240 can include the server, at 244, obtaining a first data pool of different types of data. The different types of data include a first group of IP addresses as well as include personal identifiable information that can include a person's name, physical address, telephone number, email address, location coordinates, location data, or any other data. In addition, the method 240 can include the server, at 246, selecting a first portion of the first group of IP addresses using the artificial intelligence techniques. Also, the method 240 can include the server, at 248, storing the first portion of the first group of IP addresses in a first table of IP addresses.

In one or more embodiments, the method 240 can include the server, at 250, accessing a first IP address from the first table and determining whether the first IP address in the first table is not currently being used (as described herein). If so, the method 240 can include the server, at 252, assigning a first IP address in the first table to a first computing device. If not, the method 240 can include the server, at 254, removing the first IP address from the first table. Further, the method 240 can include the server, at 256, including the selection of the first portion of the first group of IP addresses into the training data for future training purposes. The IP address can be an IPv4 address or an IPv6 address.

Referring to FIG. 2D, in one or more embodiments, the method 260 can include the server, at 262, training artificial intelligence techniques on training data to recognize IP addresses from a data pool that includes different types of data (details of the training of the artificial intelligence techniques are discussed when describing FIGS. 2E-2G). Further, the method 260 can include the server, at 264, obtaining a first data pool of different types of data. The different types of data include a first group of IP addresses as well as include personal identifiable information that can include a person's name, physical address, telephone number, email address, location coordinates, location data, or any other data. In addition, the method 260 can include the server, at 266, selecting a first portion of the first group of IP addresses using the artificial intelligence techniques. Also, the method 260 can include the server, at 268, storing the first portion of the first group of IP addresses in a first table of IP addresses.

In one or more embodiments, the method 260 can include the server, at 270, accessing a first IP address from the first table and determining the first IP address in the first table is not currently being used (as described herein). Further, the method 260 can include the server, at 272, assigning a first IP address in the first table to a first computing device. In addition, the method 260 can include the server, at 274, accessing a second IP address from the first table and determining the second IP address in the first table is currently being used by another computing device (as described herein). Also, the method 260 can include the server 276, removing the first IP address from the first table. Further, the method 260 can include the server, at 278, including the selection of the first portion of the first group of IP addresses into the training data for future training purposes. The IP address can be an IPv4 address or an IPv6 address.

FIG. 2E is a block diagram illustrating example, non-limiting embodiment of systems functioning within the communication network of FIG. 1 in accordance with various aspects described herein. In one or more embodiments, the system 200a can be used for training a neural network 206a. In addition, the system 200a includes training data 202a, neural network 206a, comparison dataset 208a, server 210a, and computing device 212a operated by a user 214a. Training data 202a can be stored in a database 204 as shown in FIG. 2A. The training data 202a can list an individual's (e.g., employee) personal information such as name, address, different telephone numbers, label for employee computer, and IP address of employee computer. In other embodiments, training data can comprise personal identifiable information that can include a person's name, physical address, telephone number, email address, location coordinates, location data, or any other data. Further, the neural network 206a can be similar or same neural network described in FIG. 2B. The server 210a can store the comparison dataset 208a, and/or implement the neural network 206a. Further, the server 210a can be accessed by a user 214a by a computing device 212a. The comparison dataset 208a can be used by the server 210a to determine whether the neural network 206a correctly identifies an IP address or Non-IP address data for training of the neural network 206a. That is, the server 210a compares the data structure of the comparison dataset 208a with the data structure of the data identified as an IP address by the neural network 206a and/or identified as Non-IP address data by the neural network 206a. The computing device 212a can include a laptop computer, tablet computer, mobile phone, desktop computer, or any other computing device. The user 214a can be an employee or other personnel of the employer company that administers IP addresses for the employer company.

In one or more embodiments, the training data 202a can be provided to the neural network 206a as input for training purposes. The neural network 206a can be implemented by a server 210a. The neural network 206a can be trained to recognize data listed in the training data 202a as either an IP address or as Non-IP address data. In some embodiments, a first output of the neural network 206a can be a data item 203a from the training data 202a that the neural network 206a recognizes or identifies as an IP address and a second output of the neural network 206a can be a data item 205a from the training data 202a that the neural network 206a recognizes or identifies as Non-IP address data. Further, the neural network 206a can determine the likelihood that the neural network 206a correctly identifies the data item 203a as an IP address as well as determine the likelihood 213a that the neural network 206a correctly identifies a data item 205a as Non-IP address data. In addition, the server 210a can compare the data item 203a to a comparison dataset 208a to determine whether the data structure of data item 203a conforms to the data structure of an IP address as show in the comparison dataset 208a. The data structure of an IP address can be a series four three-digit numbers ranging from 0 and 255 separated by a period. The comparison dataset 208a can indicate this data structure. In other embodiments, the comparison dataset 208a can indicate the data structure of an IPv6 address or the data structure of some other addressing mechanism.

In some embodiments, the server 210a compares the data structure of the data item 203a and determines whether the data structure of the data item 203a conforms to the comparison dataset 208a. If so, the server 210a uses the example training scenario as training data for the future for training of correctly identifying an IP address. However, after comparing the data structure of the data item 203a, the server 210a determines that the data structure of the data item 203a does not conform to the comparison dataset 208a, then the server 210a uses the example training scenario as training data for future training to show when an IP address is incorrectly identified.

In other embodiments, the server 210a compares the data structure of the data item 205a and determines whether the data structure of the data item 205a conforms to the comparison dataset 208a. If not, the server 210a uses the example training scenario as training data for future training to correctly identify Non-IP address data. However, after comparing the data structure of the data item 205a, the server 210a determines that the data structure of the data item 205a does not conform to the comparison dataset 208a, then the server 210a uses the example training scenario as training data for future training to show when Non-IP address data is correctly identified.

In further embodiments, the neural network 206a can indicate the probability of certainty (72%) 211a that it believes it correctly identified a data item 203a as an IP address and indicate the probability of certainty (81%) 215a that it believes it correctly identified a data item 205a as Non-IP address data. In additional embodiments, the neural network 206a can be trained until the probability of certainty is above a threshold (e.g., 90%). Thus, in the example shown in FIG. 2E, the probability of certainty for correctly identifying an IP address and Non-IP address data is each less than 90% such that the neural network 206a may be further trained to increase its probability certainty in correctly identifying both IP address and Non-IP address data prior to being deployed for use. In some embodiments, the threshold for the probably of certainty to correctly identify an IP address can be a same value as the threshold for the probably of certainty to correctly identify Non-IP address data (e.g., 90%). In other embodiments, the threshold for the probably of certainty to correctly identify an IP address can be a different value as the threshold for the probably of certainty to correctly identify Non-IP address data.

In further embodiments, instead of, or in addition to, the server 210a comparing data items 203a, 205a to a comparison dataset 208a, a user 214a (such as company personnel) can access the data item 203a and data item 205a and provide user-generated input to the server 210a to indicate whether data item 203a has been correctly identified by the neural network 206a as an IP address and/or whether data item 205a has been correctly identified by the neural network 206a as Non-IP address data.

For example, a data item 203a can be a phone number that the neural network 206a indicates to be an IP address with a probability certainty of 72% 211a and a data item 205a can be a different phone number that the neural network 206a indicates to be Non-IP address data with a probability certainty of 81% 215a. In some embodiments, the server 210a compares data item 203a to the comparison dataset 208a and determines that data item 203a is incorrectly identified as an IP address. In other embodiments, the server 210a compares data item 205a to the comparison dataset 208a and determines that data item 205a is correctly identified as Non-IP address data. In further embodiments, the server 210a can provide data item 203a and data item 205a (along with an indication on the identification of the data items by the neural network on whether they each have been identified as IP address or Non-IP address data, respectively) to the computing device 212a for viewing by user 214a. The user 214a can provide, through computing device 212a, user-generated input that indicates whether data item 203a has been correctly identified as an IP address and whether data item 205a has been correctly identified as Non-IP address data. For example, user 214a can provide user-generated input that indicates data item 203a has been incorrectly identified as an IP address and provide user-generated input that indicates data item 205a has been correctly identified as Non-IP address data.

In another example, a data item 207a from the training data 202a can be an IP address that the neural network 206aa correctly indicates to be an IP address with a probability certainty of 92% 217a and a data item 209a from the training data 202a can be a phone number that the neural network 206aa indicates to be Non-IP address data with a probability certainty of 96% 219a. In some embodiments, the server 210a compares data item 207a to the comparison dataset 208a and determines that data item 207a is correctly identified as an IP address. In other embodiments, the server 210a compares data item 209a to the comparison dataset 208a and determines that data item 209a is correctly identified as Non-IP address data. In further embodiments, the server 210a can provide data item 207a and data item 209a (along with an indication on the identification of the data items by the neural network on whether they each are IP address or Non-IP address data) to the computing device 212a for viewing by user 214a. The user 214a can provide, through computing device 212a, user-generated input that indicates whether data item 207a has been correctly identified as an IP address and whether data item 209a has been correctly identified as Non-IP address data. Further, the probably of certainty that the neural network 206aa to correctly identify both the IP address and Non-IP address data is above a threshold (e.g., 90%) such that the neural network 206aa may no longer be trained and deployed for use.

In one or more embodiments, three data sets from a data pool can be reserved for training, validation, and testing purposes. In some embodiments, the training data set can be used as training data 204 in FIG. 2A to feed into neural network 224 and flow through its hidden layers 226, 228, 230 in FIG. 2B such output layer 232 of the neural network 224 either recognizes either an IP address 234, or non-IP address data 236.

In further embodiments, the validation data set can be used to calculate loss and accuracy. Different algorithms can be used to fine tune neural network and one of these algorithms can be selected according to its highest accuracy as the model. In additional embodiments, the test data set, which is unknown to neural network, and run through the neural network as part of training data 204 in FIG. 2A and to determine it has recognized as IP address stored in 209 or non-IP address. Data recognized as IPv4 address is stored in 208, while IPv6 is stored in 210 in FIG. 2A.

In one or more embodiments, different network algorithms have different strengths to handle different types of data 202a in FIG. 2E with characteristic such as IP address, email address, etc. Different models are selected based on the highest accuracy rate during training and validation phases, so when it is used in the testing phase, a better accuracy outcome can be achieved.

In one or more embodiments, once a fine tuned neural network 206aa in FIG. 2E is achieved, data which was not used in training and validation phases on 206aa can be analyzed and split (categorized, identified, etc.) into 217a IP address related data and 219a non-IP address data. Server 202 in FIG. 2A can store these IP address data 217A into 209. Further, neural network 206aa can split (categorize, identify, etc.) 217a data into IPv4 and IPv6 data. In additional embodiments, once a mature neural network is found and being used in 206aa, if any update (add/modify/delete) of data (IP address or non-IP address data) to data pool 206 in FIG. 2A or 206b in FIG. 2H, server 202 in FIG. 2A does not need to train neural network anymore. Embodiments can keep recognized IP address data in database 210b in FIG. 2H up-to-date so it can be used in run time.

FIGS. 2F-G depicts illustrative embodiments of methods in accordance with various aspects described herein. The methods shown in FIGS. 2F-G are directed to training a neural network. Referring to FIG. 2F, in one or more embodiments, the method 220a can be implemented by a server as shown in FIGS. 2A and 2E. The method 220a includes the server, at 222a, providing training data to the neural network (data from data pool can be provided to neural network 206aa in FIG. 2E, and the data can be identified as IP address data or non-IP address data, as in steps 224a or 224b). Further, the method 220a includes the server, at 224a, determining a data item from the training data is an IP address by the neural network. In addition, the method 220a includes the server, at 226a, determining the probability of certainty that the data item is correctly identified as an IP address by the neural network. Also, the method 220a includes the server, at 228a, comparing the data item to the comparison dataset. Further, the method 220a includes the server, at 230a, determining the data item has not correctly been identified as an IP address based on the comparing of the data item to the comparison dataset. In addition, the method 220a includes the server, at 232a, providing the training scenario into the training data for future training of the neural network. Also, the method 220a includes the server, at 234a, determining that the probability of certainty of correctly identifying the data item as an IP address is below a threshold, and the method 220a includes the server, at 236a, determining that the neural network needs to be further trained to improve the probability of certainty to be above the threshold. Such a determination can be made based on whether the neural network correctly identified the data item as an IP address and/or whether the probably of certainty of correctly identifying the data item as an IP address is less than a threshold.

In one or more embodiments, the method 220a includes the server, at 222a, providing training data to the neural network. Further, the method 220a includes the server, at 224b, determining a data item from the training data is Non-IP address data by the neural network. In addition, the method 220a includes the server, at 226b, determining the probability of certainty that the data item is correctly identified as Non-IP address data by the neural network. Also, the method 220a includes the server, at 228b, comparing the data item to the comparison dataset. Further, the method 220a includes the server, at 230b, determining the data item has not correctly been identified as Non-IP address data based on the comparing of the data item to the comparison dataset. In addition, the method 220a includes the server, at 232b, providing the training scenario into the training data for future training of the neural network. Also, the method 220a includes the server, at 234b, determining that the probability of certainty of correctly identifying the data item as Non-IP address data is below a threshold, and the method 220a includes the server, at 236a, determining that the neural network needs to be further trained to improve the probability of certainty to be above the threshold. Such a determination can be made based on whether the neural network correctly identified the data item as a Non-IP address data and/or whether the probably of certainty of correctly identifying the data item as Non-IP address data is less than a threshold.

Referring to FIG. 2G, in one or more embodiments, the method 240a can be implemented by a server as shown in FIGS. 2A and 2E. The method 240a includes the server, at 242a, providing training data to the neural network. Further, the method 240a includes the server, at 244a, determining a data item from the training data is an IP address by the neural network. In addition, the method 240a includes the server, at 246a, determining the probability of certainty that the data item is correctly identified as an IP address by the neural network. Also, the method 240a includes the server, at 248a, comparing the data item to the comparison dataset. Further, the method 240a includes the server, at 250a, determining the data item has correctly been identified as an IP address based on the comparing of the data item to the comparison dataset. In addition, the method 240a includes the server, at 252a, providing the training scenario into the training data for future training of the neural network. Also, the method 240a includes the server, at 254a, determining that the probability of certainty of correctly identifying the data item as an IP address is above a threshold, and the method 240a includes the server, at 256a, determining that the neural network may not need to be further trained to improve the probability of certainty to be above the threshold. Such a determination can be made based on whether the neural network correctly identified the data item as an IP address and/or whether the probably of certainty of correctly identifying the data item as an IP address is above a threshold.

In one or more embodiments, the method 240a includes the server, at 242a, providing training data to the neural network. Further, the method 240a includes the server, at 244b, determining a data item from the training data is Non-IP address data by the neural network. In addition, the method 240a includes the server, at 246b, determining the probability of certainty that the data item is correctly identified as Non-IP address data by the neural network. Also, the method 240a includes the server, at 248b, comparing the data item to the comparison dataset. Further, the method 240a includes the server, at 250b, determining the data item has correctly been identified as Non-IP address data based on the comparing of the data item to the comparison dataset. In addition, the method 240a includes the server, at 252b, providing the training scenario into the training data for future training of the neural network. Also, the method 240a includes the server, at 254b, determining that the probability of certainty of correctly identifying the data item as Non-IP address data is above a threshold, and the method 240a includes the server, at 256a, determining that the neural network may not need to be further trained to improve the probability of certainty to be above the threshold. Such a determination can be made based on whether the neural network correctly identified the data item as Non-IP address and/or whether the probably of certainty of correctly identifying the data item as Non-IP address is above a threshold.

While for purposes of simplicity of explanation, the respective processes are shown and described as a series of blocks in FIGS. 2C-D and FIGS. 2F-G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In addition, portions of some embodiments described herein can be combined with portions of other embodiments described herein.

Although embodiments described herein are directed to a neural network recognizing or identifying an IP address from a mixed data pool, other embodiments can include using a neural network recognizing or identifying other types of data that can include, but not limited to, telephone number, physical address, location coordinates, location data, email address, persons names, or data with a specific data structure, or any other data.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems 200, 220 and method 240, 260 presented in FIGS. 1, 2A, 2B, 2C, 2D and 3. For example, virtualized communication network 300 can facilitate in whole or in part identifying an IP address from a pool of different types of data that include a group of IP addresses and determining whether the IP address is currently being used by a computing device.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
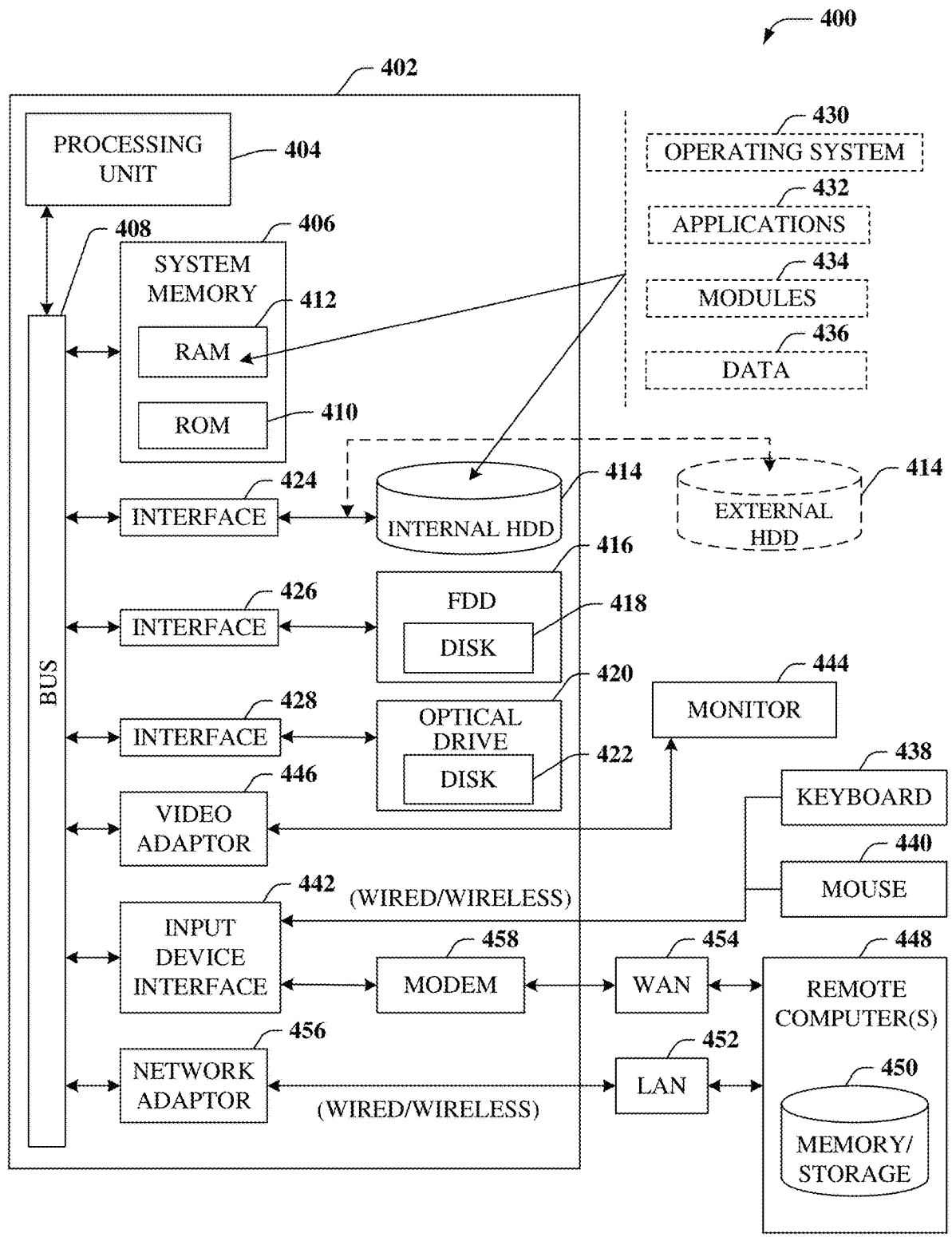
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part an identifying IP address from a pool of different types of data that include a group of IP addresses and determining whether the IP address is currently being used by a computing device. The servers, databases, information repositories, and computing devices described herein can comprise the computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures.

The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
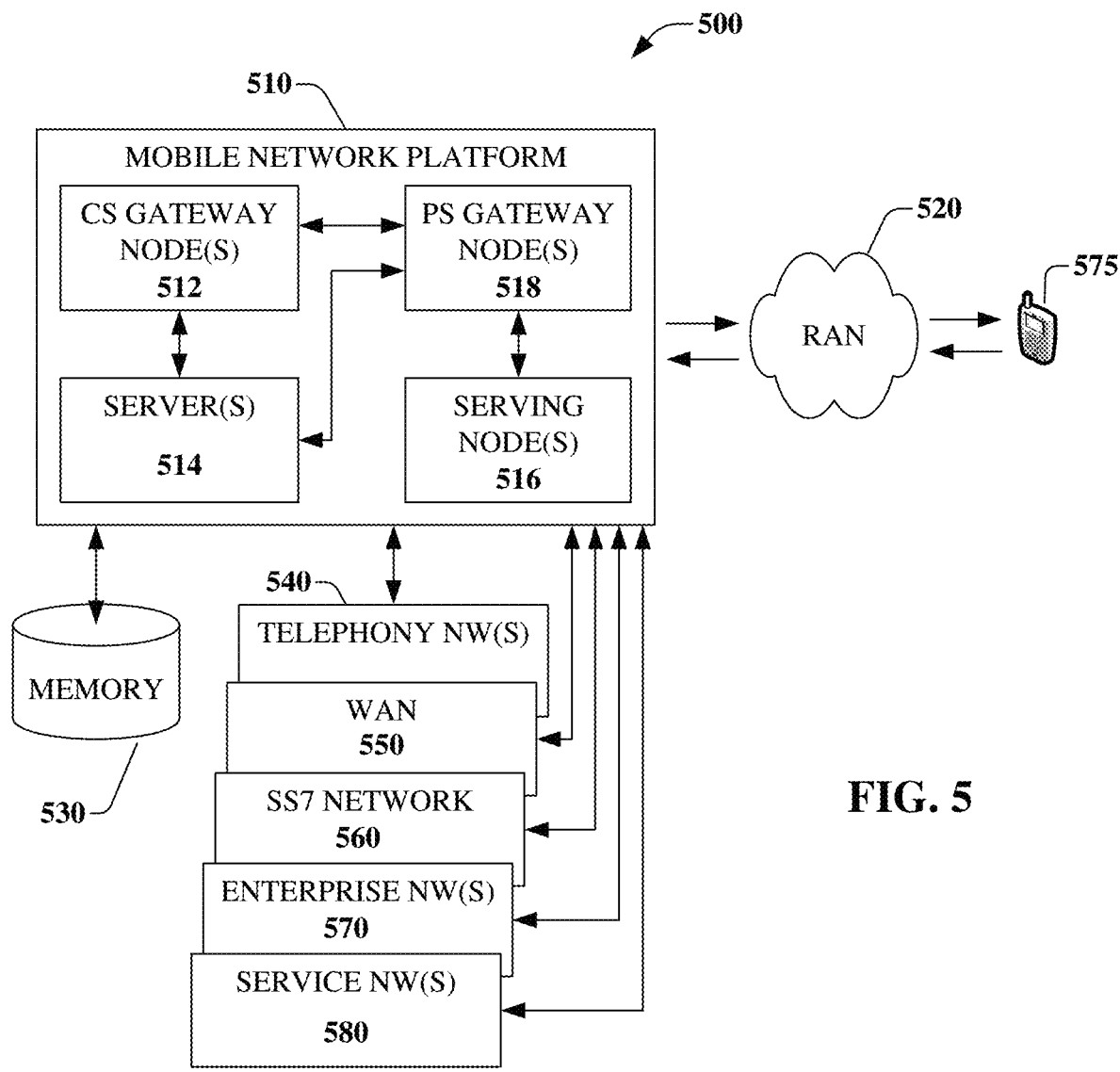
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying an IP address from a pool of different types of data that include a group of IP addresses and determining whether the IP address is currently being used by a computing device. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
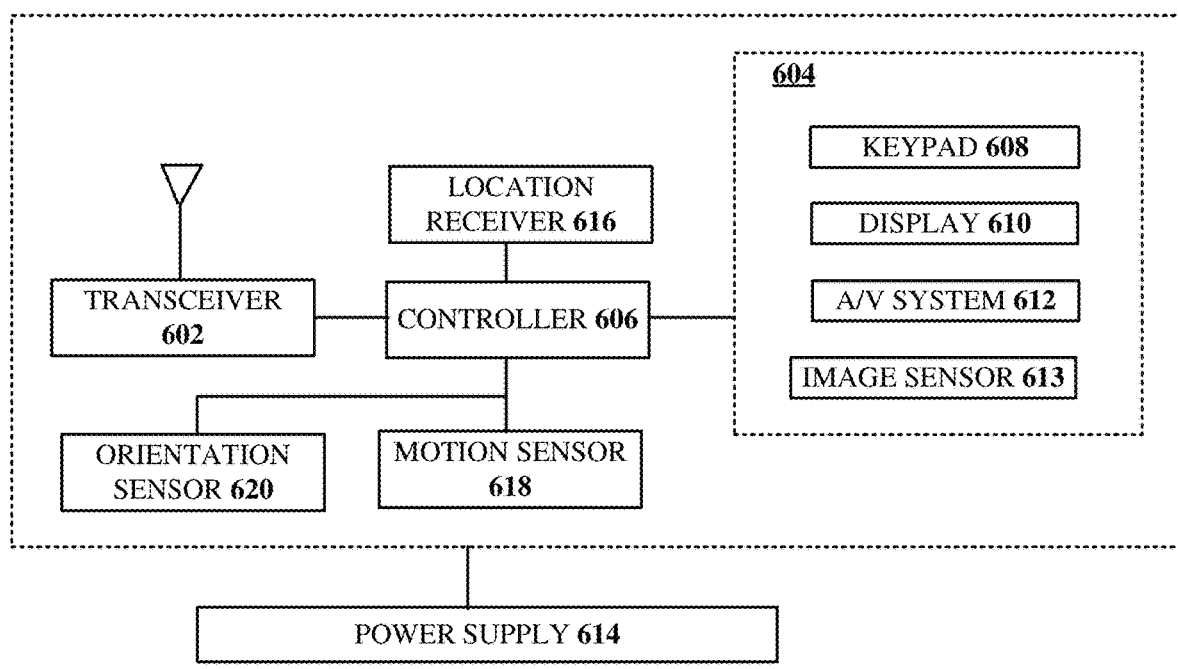
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part the embodiments described herein. The servers, databases, information repositories, and computing devices described herein can comprise the communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
      obtaining a first data pool of different types of data, wherein the first data pool comprises a first group of IPv4 addresses and a second group of non-IP address data;
      identifying a first portion of the first group of IPv4 addresses from a second portion of the second group of non-IP address data from within the first data pool using artificial intelligence techniques;
      selecting the first portion of the first group of IPv4 addresses using the artificial intelligence techniques;
      storing the first portion of the first group of IPv4 addresses in a first table of IPv4 addresses; and
      assigning a first IPv4 address in the first table to a first computing device in response to determining the first IPv4 address in the table is not currently being used.

2. The device of claim 1, wherein the first data pool includes a third group of IPv6 addresses, wherein the operations further comprise:
   identifying a third portion of the third group of IPv6 addresses from the second portion of the second group of non-IP address data from within the first data pool using the artificial intelligence techniques;
   selecting the third portion of the third group of IPv6 addresses using the artificial intelligence techniques; and
   storing the third portion of the third group of IPv6 addresses in a second table of IPv6 addresses.

3. The device of claim 2, wherein the operations further comprise assigning a first IPv6 address in the second table to a second computing device in response to determining the first IPv6 address in the second table is not currently being used.

4. The device of claim 2, wherein the operations further comprise removing a second IPv6 address from the second table in response to determining the second IPv6 address in the second table is currently being used by a third computing device.

5. The device of claim 2, wherein the operations further comprise including the selecting of the third portion of the third group of IPv6 addresses into training data.

6. The device of claim 1, wherein the operations further comprise removing a second IPv4 address from the first table in response to determining the second IPv4 address in the first table is currently being used by a fourth computing device.

7. The device of claim 1, wherein the operations further comprise training the artificial intelligence techniques on training data to recognize IPv4 addresses from a second data pool that includes the different types of data.

8. The device of claim 1, wherein the operations further comprise training the artificial intelligence techniques on training data to recognize IPv6 addresses from a third data pool that includes the different types of data.

9. The device of claim 1, wherein the non-IP address data comprises of at least one of personal identifiable information, name, physical address, telephone number, email address, location coordinates, location data, or a combination thereof.

10. A non-transitory machine-readable medium, comprising executable instructions that, when executed by a processing system including a processor, facilitate performance of operations, the operations comprising:
obtaining a first data pool of different types of data, wherein the first data pool comprises a first group of IPv4 addresses and a second group of non-IP address data; identifying a first portion of the first group of IPv4 addresses from a second portion of the second group of non-IP address data from within the first data pool using artificial intelligence techniques;
selecting the first portion of the first group of IPv4 addresses using artificial intelligence techniques;
storing the first portion of the first group of IPv4 addresses in a first table of IPv4 addresses;
assigning a first IPv4 address in the first table to a first computing device in response to determining the first IPv4 address in the first table is not currently being used; and
removing a second IPv4 address from the first table in response to determining the second IPv4 address in the first table is currently being used by a second computing device.

11. The machine-readable medium of claim 10, wherein the operations further comprise training the artificial intelligence techniques on training data to recognize IPv4 addresses from a second data pool that includes the different types of data.

12. The machine-readable medium of claim 10, wherein the operations further comprise including the selecting of the first portion of the first group of IPv4 addresses into training data.

13. The machine-readable medium of claim 10, wherein the first data pool includes a third group of IPv6 addresses; wherein the operations further comprise:
identifying a third portion of the third group of IPv6 addresses from the second portion of the second group of non-IP address data from within the first data pool using the artificial intelligence techniques;
selecting the third portion of the third group of IPv6 addresses using the artificial intelligence techniques; and
storing the third portion of the third group of IPv6 addresses in a second table of IPv6 addresses.

14. The machine-readable medium of claim 13, wherein the operations further comprise assigning a first IPv6 address in the second table to a third computing device in response to determining the first IPv6 address in the second table is not currently being used.

15. The machine-readable medium of claim 13, wherein the operations further comprise removing a second IPv6 address from the second table in response to determining the second IPv6 address in the second table is currently being used by a fourth computing device.

16. The machine-readable medium of claim 13, wherein the operations further comprise including the selecting of the second portion of the second group of IPv6 addresses into training data.

17. The machine-readable medium of claim 10, wherein the operations further comprise training the artificial intelligence techniques on training data to recognize IPv6 addresses from a third data pool that includes the different types of data.

18. A method, comprising:
training, by a processing system including a processor, artificial intelligence techniques on training data to recognize IPv4 addresses from a first data pool that includes different types of data;
obtaining, by the processing system, a second data pool of the different types of data, wherein the second data pool comprises a first group of addresses and a second group of non-IP address data;
identifying, by the processing system, a first portion of the first group of IPv4 addresses from a second portion of the second group of non-IP address data from with the second data pool using the artificial intelligence techniques;
selecting, by the processing system, the first portion of the first group of IPv4 addresses using the artificial intelligence techniques;
storing, by the processing system, the first portion of the first group of IPv4 addresses in a first table of IPv4 addresses; and
assigning, by the processing system, a first IPv4 address in the first table to a first computing device in response to determining the first IPv4 address in the first table is not currently being used.

19. The method of claim 18, comprising:
training, by the processing system, the artificial intelligence techniques on the training data to recognize IPv6 addresses from a third data pool that includes the different types of data wherein the different types of data include a third group of IPv6 addresses;
identifying, by the processing system, a third portion of the third group of IPv6 addresses from the second portion of the second group of non-IP address data from within the second data pool using the artificial intelligence techniques;
selecting, by the processing system, the third portion of the third group of IPv6 addresses using the artificial intelligence techniques; and
storing, by the processing system, the third portion of the third group of IPv6 addresses in a second table of IPv6 addresses.

20. The method of claim 19, comprising assigning, by the processing system, a first IPv6 address in the second table to a second computing device in response to determining the first IPv6 address in the second table is not currently being used.

* * * * *

UNITED STATES PATENT AND TRADEMARK OFFICE
CERTIFICATE OF CORRECTION

PATENT NO. : 10,972,427 B1  
APPLICATION NO. : 16/710407  
DATED : April 6, 2021  
INVENTOR(S) : Yuan-Chi Hu Page 1 of 1

It is certified that error appears in the above-identified patent and that said Letters Patent is hereby corrected as shown below:

In the Claims

Column 30, Lines 10-30 In Claim 18 should read:
18. A method, comprising:
    training, by a processing system including a processor, artificial intelligence techniques on training data to recognize IPv4 addresses from a first data pool that includes different types of data;
    obtaining, by the processing system, a second data pool of the different types of data, wherein the second data pool comprises a first group of IPv4 addresses and a second group of non-IP address data;
    identifying, by the processing system, a first portion of the first group of IPv4 addresses from a second portion of the second group of non-IP address data from with the second data pool using the artificial intelligence techniques;
    selecting, by the processing system, the first portion of the first group of IPv4 addresses using the artificial intelligence techniques;
    storing, by the processing system, the first portion of the first group of IPv4 addresses in a first table of IPv4 addresses; and
    assigning, by the processing system, a first IPv4 address in the first table to a first computing device in response to determining the first IPv4 address in the first table is not currently being used.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*